US012654537B2

(12) United States Patent　　(10) Patent No.:　US 12,654,537 B2
Kaltenbach et al.　　　　　　　(45) Date of Patent:　　Jun. 16, 2026

(54) MOTOR VEHICLE TRANSMISSION FOR AN AT LEAST PARTIALLY ELECTRICALLY DRIVEN MOTOR VEHICLE

(71) Applicant: ZF Friedrichshafen AG, Friedrichshafen (DE)

(72) Inventors: Johannes Kaltenbach, Friedrichshafen (DE); Thomas Martin, Weissensberg (DE); Fabian Kutter, Kressbronn (DE); Johannes Glückler, Friedrichshafen (DE); Kai Bornträger, Langenargen (DE); Stefan Blattner, Ravensburg (DE); Christian Mittelberger, Ravensburg (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/980,726

(22) Filed: Dec. 13, 2024

(65) Prior Publication Data

US 2025/0196611 A1　　Jun. 19, 2025

(30) Foreign Application Priority Data

Dec. 14, 2023　　(DE) ..................... 10 2023 212 674.5

(51) Int. Cl.
*B60K 6/365*　　　(2007.10)
*B60K 6/442*　　　(2007.10)
*F16H 3/72*　　　(2006.01)

(52) U.S. Cl.
CPC .............. *B60K 6/365* (2013.01); *B60K 6/442* (2013.01); *F16H 3/727* (2013.01); *F16H 2200/2064* (2013.01); *F16H 2200/2094* (2013.01)

(58) Field of Classification Search
CPC ......... B60K 6/365; B60K 6/442; F16H 3/727; F16H 2200/2064; F16H 2200/2094
See application file for complete search history.

(56) References Cited

U.S. PATENT DOCUMENTS

| | | | |
|---|---|---|---|
| 2021/0123512 A1* | 4/2021 | Glückler | ................... F16H 3/66 |
| 2022/0196083 A1* | 6/2022 | Renner | ................... F16D 21/06 |
| 2022/0364631 A1* | 11/2022 | Glückler | .............. F16H 37/082 |
| 2024/0066971 A1* | 2/2024 | Kaltenbach | ........... B60K 6/547 |

* cited by examiner

*Primary Examiner* — Tisha D Lewis
(74) *Attorney, Agent, or Firm* — Secant IP, PLLC

(57) ABSTRACT

A motor vehicle transmission (2) has a first drive input shaft (9), a second drive input shaft (10), a drive output shaft (11), and a first planetary gearset (P1) and a second planetary gearset (P2). The drive input shafts (9, 10) are designed to be coupled in each case to a respective drive machine. In addition, a first shifting device (26) and a second shifting device (27) are provided. The motor vehicle transmission can be part of a drive unit (1), a motor vehicle drive axle, or a hybrid or electric vehicle. A method is provided for operating a motor vehicle transmission and a drive unit.

3 Claims, 4 Drawing Sheets

| | A | B | D | E | | |
|------|---|---|---|---|-----|---|
| I | x | | | x | G1 | |
| II | x | | x | | G1 | |
| III | | x | x | | G2 | |
| IV | | x | | x | G2 | |
| V | | | x | | G3 | |
| VI | x | | | | G1 | |
| VII | | x | | | G2 | |
| VIII | | | | x | | |

Fig. 3

MOTOR VEHICLE TRANSMISSION FOR AN AT LEAST PARTIALLY ELECTRICALLY DRIVEN MOTOR VEHICLE

RELATED APPLICATIONS

This application claims the benefit of and right of priority under 35 U.S.C. § 119 to German Patent Application no. 10 2023 212 674.5, filed on 14 Dec. 2023, the contents of which are incorporated herein by reference in its entirety.

FIELD OF THE DISCLOSURE

The invention relates to a motor vehicle transmission for an at least partially electrically driven motor vehicle, comprising a first drive input shaft, a second drive input shaft, a drive output shaft, and a first planetary gearset and a second planetary gearset, wherein the first drive input shaft is designed to be coupled to a first drive machine, in particular a first electric machine, and the second drive input shaft is designed to be coupled to a second drive machine, in particular a second electric machine, wherein the first planetary gearset and the second planetary gearset each comprise a first element, a second element, and a third element, in the form, respectively, of a sun gear, a planetary carrier, and a ring gear in each case, wherein to engage various gears precisely two shifting devices in the form of a first shifting device and a second shifting device are provided, wherein the first shifting device comprises a first coupling element which can be positioned in precisely two different gear engagement positions, such that in its first gear engagement position it immobilizes the first element of the second planetary gearset, wherein the first element of the first planetary gearset is connected rotationally fixed to the first drive input shaft and the third element of the first planetary gearset is immobilized, wherein the second element of the second planetary gearset is connected rotationally fixed to the drive output shaft, wherein the second element of the first planetary gearset and the third element of the second planetary gearset are connected rotationally fixed to one another, and wherein the second shifting device comprises a second coupling element which can be positioned in precisely two different gear engagement positions, such that in its first gear engagement position it connects the first element of the second planetary gearset rotationally fixed to the second drive input shaft and in its second gear engagement position it brings the first drive input shaft and the second drive input shaft into rotationally fixed connection with one another. In addition, the invention relates to a drive unit for an at least partially electrically driven motor vehicle, a motor vehicle drive axle for a hybrid or electric vehicle, a hybrid or electric vehicle, and methods for operating a motor vehicle transmission and a drive unit.

BACKGROUND

In motor vehicles made as hybrid or electric vehicles, as part of a respective drivetrain between at least one electric machine and the drive wheels of the motor vehicle concerned, a motor vehicle transmission is provided in order to be able to transmit a drive movement of the at least one electric machine to the drive wheels, especially in the slow range. Beside single-gear motor vehicle transmissions, sometimes motor vehicle transmissions by means of which more than one gear can be engaged are used.

From DE 10 2019 214 986 A1 a motor vehicle drive axle is known, such that this drive axle comprises a drive unit with a motor vehicle transmission and two electric machines are provided. The rotors of the two electric machines are in each case connected rotationally fixed to a respectively associated drive input shaft of the motor vehicle transmission. In addition, the motor vehicle transmission comprises two planetary gearsets, each consisting of a sun gear, a planetary carrier, and a ring gear. Furthermore, the motor vehicle transmission comprises two shifting devices by means of which in each case the function of two shifting elements can be reproduced and each of which, for that purpose, comprises a coupling element. The respective coupling element of each shifting device, besides a neutral position, can be moved to precisely two gear engagement positions in which the coupling element produces a rotationally fixed connection between components of the motor vehicle transmission and thereby creates an associated power flow path by way of the shifting device concerned. Whereas by way of one shifting device, in the gear engagement positions of the associated coupling element different gears can be engaged between the first drive input shaft and a drive output shaft of the motor vehicle transmission, so that the electric machine connected to the first drive input shaft can act in the gear, by means of the other shifting device on the one hand the second drive input shaft can be connected rotationally fixed to the first drive input shaft, whereby the gears that can be engaged between the first drive input shaft and the drive output shaft can also be used for the electric machine connected to the second drive input shaft. On the other hand, however, by means of the other shifting device the second drive input shaft can be coupled to the second planetary gearset.

SUMMARY

Starting from the above-described prior art, the purpose of the present invention is now to produce a design alternative to that of the prior art for a motor vehicle transmission with which two drive machines can be connected in a suitable manner.

This objective is achieved by a transmission for an at least partially electrically driven motor vehicle, as disclosed herein. Further advantageous developments and embodiments of the invention will be apparent in light of the present disclosure. A drive unit in which a motor vehicle according to the invention is used is, further, the object of the present disclosure. In addition, the present disclosure relates to a motor vehicle drive axle for a hybrid or electric vehicle, in addition to a hybrid or electric vehicle. Finally, the present disclosure relates to a method for operating a motor vehicle transmission according to the invention and to a method for operating a drive unit.

According to the invention, a motor vehicle transmission comprises a first drive input shaft, a second drive input shaft, a drive output shaft, and a first planetary gearset and a second planetary gearset. The first drive input shaft is designed to be coupled to a first drive machine, in particular a first electric machine, and the second drive input shaft is designed to be coupled to a second drive machine, in particular a second electric machine. The first planetary gearset and the second planetary gearset consist in each case of a first element, a second element, and a third element, respectively in the form of a sun gear, a planetary carrier, and a ring gear in each case. To engage various gears precisely two shifting devices are provided, namely a first shifting device and a second shifting device, wherein the first shifting device comprises a first coupling element that can be positioned in precisely two different gear engagement positions and, in its first gear engagement position, it immobilizes the first element of the second planetary gearset. Furthermore, the first element of the first planetary gearset is connected rotationally fixed to the first drive input shaft, whereas the third element of the first planetary gearset is immobilized. The second element of the second planetary gearset is connected rotationally fixed to the drive output shaft, whereas the second element of the first planetary gearset and the third element of the second planetary gearset are connected rotationally fixed to one another. Moreover, the second shifting device comprises a second coupling element that can be positioned in precisely two different gear engagement positions, such that in its first gear engagement position the second coupling element connects the first element of the second planetary gearset rotationally fixed to the second drive input shaft, and it its second gear engagement position it brings the first and second drive input shafts into rotationally fixed connection with one another.

In the context of the invention, a "shaft", such as the respective drive input shafts or the drive output shaft, is understood to be a rotatable component of the transmission by way of which a power flow between components can be created. The shaft can connect the components to one another axially or radially or even both axially and radially. Thus, the shaft can also be present as an intermediate component by means of which, for example, a particular component can be connected purely radially. Furthermore, depending on its shape and connection mode to the components or its connectivity thereto, the shaft concerned can be a solid shaft, a hollow shaft or a shaft that is partially solid and partially hollow. Alternatively, or in addition, the shaft can be made in one piece or in more than one piece.

In the context of the invention, "axial" means an orientation in the direction of a longitudinal central axis of the motor vehicle transmission, parallel to which rotation axes of shafts of the motor vehicle transmission and of the elements of the planetary gearsets are also orientated. "Radial" then means an orientation in the direction of the diameter of any component of the transmission, in particular a shaft or an element of the planetary gearsets.

The motor vehicle transmission according to the invention comprises a first drive input shaft and a second drive input shaft, the two drive input shafts being in particular arranged coaxially with one another. In this case, in the motor vehicle transmission according to the invention the first and second drive input shafts are designed in each case to be coupled on the drive input side to a respective drive machine, wherein each drive input shaft preferably serves to form a coupling with just one drive machine. For that purpose, each drive input shaft has in particular a connection point at which the drive input shaft concerned can be coupled to the associated drive machine. In the installed condition of the motor vehicle transmission, the connection of the associated drive machine to the connection point of the drive input shaft concerned is preferably permanent, particularly when the associated drive machine is in the form of an electric machine. Alternatively, however, an intermediate starting element such as a hydrodynamic torque converter, a starter clutch etc. can be provided, by way of which the respective drive input shaft is or can be coupled to the associated upstream drive machine at the one connection point of the drive input shaft concerned. This is done in particular when the associated drive machine is an internal combustion engine.

The coupling between the associated drive machine and the drive input shaft concerned is preferably in a form such that in the installed condition of the motor vehicle transmission and when the coupling has been produced, a rotation speed of the drive input shaft of the motor vehicle transmission and a rotation speed of the associated drive machine are always in a fixed rotation speed ratio. Thus, in the context of the invention, between the drive input shaft concerned and the associated drive machine a further transmission stage such as a spur gear stage and/or a planetary stage can also be provided, if necessary, by way of which a preliminary gear ratio of a rotation movement of the associated drive machine can be produced at the drive input shaft concerned. Preferably however, the drive input shaft is connected rotationally fixed to the associated drive machine.

The motor vehicle transmission is in particular a transmission for a hybrid or electric vehicle, which is designed to be connected via the drive input shaft concerned to a respective drive machine in the form of an electric machine. As described earlier, a rotor of each electric machine can be connected by way of at least one gear ratio to the drive input shaft of the motor vehicle transmission concerned. Particularly preferably however, in the installed condition of the motor vehicle transmission according to the invention a rotor of each electric machine is connected rotationally fixed to the associated drive input shaft.

In the motor vehicle transmission according to the invention, the drive output shaft is designed in particular to couple the motor vehicle transmission on its output side to components which, in the installed condition of the motor vehicle transmission, come after the motor vehicle transmission in the direction toward the drive wheels of the motor vehicle concerned. Correspondingly, the motor vehicle transmission according to the invention is in particular a driving transmission by way of which at least one of the drive machines can be coupled to drive wheels of the motor vehicle in order to transmit a drive movement to the drive wheels with various transmission ratios. In this case, in particular the drive output shaft of the motor vehicle transmission can be coupled to a differential gearset, which is positioned coaxially with, or with an axial offset relative to the drive output shaft and which can function as a transverse or a longitudinal differential. The coupling can be in the form of a transmission stage in the form of a bevel gear stage with a transmission ratio. Alternatively, the drive output shaft can also be connected rotationally fixed to the downstream differential gearset or it can be coupled via an intermediate transmission stage, for example in the form of an additional planetary gearset.

The first and second planetary gearsets consist in each case of a first element, a second element, and a third element, wherein the elements of the respective first and second planetary gearsets are a sun gear, a planetary carrier, and a ring gear in each case. Particularly preferably, the first planetary gearset and the second planetary gearset are each minus planetary gearsets, in which the planetary carrier in each case carries at least one planetary gearwheel mounted rotatably on it, the at least one planetary gearwheel meshing with the respective sun gear and the respective ring gear. When the first and second planetary gearsets are in the form of minus planetary gearsets, the first element of each planetary gearset is its respective sun gear, the second element is its respective planetary carrier, and the third element is its respective ring gear.

Alternatively, however, in principle the first and/or the second planetary gearset could be designed as plus planetary gearsets. In such a case, the respective planetary carrier has at least one pair of planetary gearwheels mounted rotatably on it, and of these planetary gearwheels one meshes with the sun gear and one with the ring gear in each case. Moreover, the planetary gearwheels of each planetary gearwheel pair mesh with one another. Other than in the design as minus planetary gearsets, then preferably the first element of the first and second planetary gearsets is the sun gear but the second element of the first and second planetary gearsets is the ring gear and their third element is the planetary carrier in each case. Compared with a design as a minus planetary gearset, a stationary gear ratio of the planetary gearset concerned has to be increased by one. As described earlier however, in the context of the present invention the two planetary gearsets are preferably designed as minus planetary gearsets. Particularly preferably, the motor vehicle transmission according to the invention has precisely two planetary gearsets, namely the first planetary gearset and the second planetary gearset.

For the engagement of various gears, the motor vehicle transmission according to the invention comprises precisely two shifting devices, by the selective actuation of which the various gears can be engaged. The first and second shifting devices each comprise a coupling element, wherein both the first coupling element, that of the first shifting device, and the second coupling element, that of the second shifting device, can each be moved to precisely two gear engagement positions. In the context of the invention a "gear engagement position" is understood to be a position or a positional range where the coupling element concerned must be located in order to bring about a rotationally fixed connection between components of the motor vehicle transmission. In this case, by means of the respective coupling element of the respective shifting device when in its gear engagement positions, different rotationally fixed connections are produced and thereby power flow paths that differ from one another are created via the shifting devices.

The invention is now based on the technical principle that the first coupling element, in its second gear engagement position, connects the first element of the second planetary gearset rotationally fixed to the second element of the second planetary gearset or to the third element of the second planetary gearset. In that way the first shifting device, besides immobilizing the first element of the second planetary gearset, also produces a rotationally fixed connection of the first element of the second planetary gearset to one of the two other elements of the second planetary gearset.

Thus, in the motor vehicle transmission according to the invention the first element of the first planetary gearset and the first drive input shaft are permanently connected rotationally fixed to one another, whereby the first drive input shaft and the first element of the first planetary gearset always rotate together. Furthermore, the second element of the first planetary gearset and the third element of the second planetary gearset are permanently connected rotationally fixed to one another, which means that the second element of the first planetary gearset and the third element of the second planetary gearset always rotate together. There is also a permanent rotationally fixed connection between the drive output shaft and the second element of the second planetary gearset, so that the drive output shaft and the second element of the second planetary gearset always rotate together. Moreover, the third element of the first planetary gearset is permanently immobilized, so that the third element of the first planetary gearset is permanently prevented from rotating.

By means of the first shifting device, various couplings of the first element of the second planetary gearset can be formed, in that in its first gear engagement position the first coupling element of the first shifting device immobilizes the first element of the second planetary gearset, whereas in its second gear engagement position the first coupling element of the first shifting device connects the first element of the second planetary gearset rotationally fixed either to the second element of the second planetary gearset or to the third element of the second planetary gearset. This last arrangement results in the blocking of the second planetary gearset.

In particular, the first coupling element in its two gear engagement positions and when moved axially between the two gear engagement positions is guided in a rotationally fixed but axially displaceable manner on a first tooth array which is connected rotationally fixed to the first element of the second planetary gearset. In its first gear engagement position the second coupling element then preferably, while still engaged with the first tooth array, engages with a second tooth array which is permanently immobilized. On the other hand, when the first coupling element of the first shifting device is moved to its second gear engagement position, then in addition to the engagement with the first tooth array the first coupling element engages in a third tooth array, which is connected rotationally fixed to the second element of the second planetary gearset or to the third element of the second planetary gearset.

Particularly preferably, the first coupling element of the first shifting device is in this case in the form of a sliding sleeve which has one or more coupling tooth arrays. On these one or more coupling tooth arrays preferably the axial rotationally fixed guiding on the first tooth array and/or the respective engagement with the second and third tooth arrays take place. The tooth arrays are preferably in the form of claw teeth, so that the first shifting device is designed as an unsynchronized shifting device.

By means of the second shifting device various rotationally fixed connections of the second drive input shaft can be formed, in that the second coupling element of the second shifting device, in its first gear engagement position, connects the second drive input shaft rotationally fixed to the first element of the second planetary gearset and in its second gear engagement position brings the second drive input shaft into rotationally fixed connection with the first drive input shaft. In particular the second shifting device is designed in such manner that in its two gear engagement positions and when moved axially between the two gear engagement positions, it is guided in a rotationally fixed but axially displaceable manner on a first tooth array which is connected rotationally fixed to the second drive input shaft. In the first gear engagement position the second coupling element then preferably also engages with a second tooth array which is permanently connected rotationally fixed to the first element of the second planetary gearset. On the other hand, in its second gear engagement position the second coupling element, in addition to its engagement with the first tooth array, also engages with a third tooth array which is permanently connected rotationally fixed to the first drive input shaft.

The second coupling element of the second shifting device is in particular in the form of a sliding sleeve, wherein the second coupling element preferably comprises one or more coupling tooth arrays on which the axially rotationally fixed guiding on the first tooth array takes place and/or the respective engagements with the second and third tooth arrays can occur. The teeth are preferably in the form of claw teeth, so that the second shifting device is designed as an unsynchronized shifting device.

The design of a motor vehicle transmission according to the invention has the advantage that thereby a structure of the motor vehicle transmission is produced, in which suitable connections to the drive machines connected to the drive input shafts can be made. Since in this case the motor vehicle transmission consists essentially of the two planetary gearsets and the two shifting devices, the motor vehicle transmission can also have a compact structure with low production costs.

In the motor vehicle transmission according to the invention, the drive input shafts and the drive output shaft are in particular arranged coaxially with one another, and it is also preferable for the planetary gearsets to be positioned coaxially with the drive input shafts and the drive output shaft. In that way a structure of the motor vehicle transmission which is particularly compact in the radial direction is produced.

In the context of the invention, a permanent "rotationally fixed" connection of components of the transmission is understood to mean that the components connected rotationally fixed to one another or brought into rotationally fixed connection with one another always rotate at the same rotation speed. The components connected rotationally fixed to one another or brought into rotationally fixed connection with one another can be separate components which are attached to one another. Alternatively, components connected rotationally fixed to one another or brought into rotationally fixed connection with one another can also be made integrally as one piece and are therefore present as a single component, this being done in particular when the components are arranged spatially close to one another.

In the context of the invention, an immobilized condition of a component of the motor vehicle transmission is in particular produced when the component is connected rotationally fixed to a permanently immobile component, which can be a housing of the motor vehicle transmission, part of such a housing or a component permanently connected rotationally fixed thereto. In the present case, the third element of the first planetary gearset is connected permanently to the immobilized component, and it would therefore be conceivable to make the third element of the first planetary gearset and the immobilized component integrally, as one piece.

In the context of the invention, the immobilization of a component of the motor vehicle transmission by a coupling element of the shifting devices, or a rotationally fixed connection between components of the motor vehicle transmission by a coupling element of the shifting devices, means that the component concerned is not permanently immobilized or that the components are not permanently coupled to one another, but rather, that immobilization or a rotationally fixed connection is only produced in the corresponding gear engagement position of the coupling element of the shifting device concerned.

In the context of the invention, the motor vehicle according to the invention can be operated in such manner that a first gear is engaged between the first drive input shaft and the drive output shaft when the first coupling element is moved to its first gear engagement position. This first gear can also be engaged at the same time between the two drive input shafts and the drive output shaft if, in addition to the first coupling element moved to its second gear engagement position, the second coupling element, is moved to its second gear engagement position. Furthermore, a second gear can be engaged between the first drive input shaft and the drive output shaft if the first coupling element is moved to its second gear engagement position, and the second gear can be engaged at the same time between the two drive input shafts and the drive output shaft if, in addition to the first coupling element moved to its second gear engagement position, the second coupling element, is also moved to its second gear engagement position. Advantageously, in that way on the one hand in the two gears a single drive by the first drive machine connected to the first drive input shaft can be realized. On the other hand, however, if necessary, a simultaneous drive by both drive machines can be obtained both in the first gear and in the second gear, for which purpose in one of the two gear engagement positions of the first coupling element at the same time the second coupling element is positioned in its second gear engagement position.

Furthermore, in the motor vehicle transmission according to the invention a superimposition of drive movements of the two drive machines can also be produced if, in the two shifting devices, only the second coupling element is moved to its first gear engagement position. In that way the drive machines connected to the drive input shafts can mutually support each other's torques with a fixed torque ratio and variable rotation speed. If a stationary gear ratio of the second planetary gearset is numerically greater by 1 than the numerical value of the stationary gear ratio of the first planetary gearset, then the torque ratio of the two drive input shafts relative to the drive output shaft will be the same, whereby the drive machines connected to the drive input shafts will support one another with an equal torque. However, the connection of the second drive input shaft via the second coupling element in its first gear engagement position can also be used to support the traction force while the first coupling element is being switched between its gear engagement positions.

Just by changing the second coupling element to its first gear engagement position, a third gear can be engaged between the two drive input shafts and the drive output shaft, in that the torques of the two drive machines connected to the drive input shafts, during their operation, are matched to one another and thereby, due to the superimposition in the second planetary gearset, a suitable traction force for obtaining the third gear is produced at the drive output shaft. This third gear can be produced without having to provide an additional shifting element in the motor vehicle transmission.

In accordance with an embodiment of the invention, the two shifting devices are arranged on a side of the first planetary gearset facing away from the second planetary gearset. In a further development of this embodiment, the first shifting device is positioned radially inside the second shifting device, in such manner that the two shifting devices are particularly preferably arranged with an axial overlap in order to obtain a nested configuration of the two shifting devices.

In a possible design of the invention, the first coupling element of the first shifting device can also be positioned in a neutral position between its two gear engagement positions, in which neutral position the first coupling element neither immobilizes the first element of the second planetary gearset nor connects the first element of the second planetary gearset rotationally fixed to the second element of the second planetary gearset or to the third element of the second planetary gearset. In that way the first drive input shaft can be decoupled from the drive output shaft.

Alternatively, preferably but in addition thereto, the second coupling element of the second shifting device can also be positioned in a neutral position between its two gear engagement positions, in which the second coupling element neither connects the first element of the second planetary gearset rotationally fixed to the second drive input shaft, nor brings the first and second drive input shafts into rotationally fixed connection with one another. In that way, by positioning the second shifting device in neutral the second drive machine connected to the second drive input shaft can be decoupled from the drive output shaft.

An object of the invention is also a drive unit, which besides a first electric machine and a second electric machine also comprises a motor vehicle transmission according to one or more of the above-described variants. A rotor of the first electric machine is coupled to the first drive input shaft of the motor vehicle transmission, while a rotor of the second electric machine is coupled to the second drive input shaft. In the context of the invention, each electric machine can in particular be operated on the one hand as a generator and on the other hand as an electric motor. In that way a drive unit can be provided, which is suitable for use in a motor vehicle in the form of a hybrid or electric vehicle. In this case the two electric machines can in particular be designed to have the same power, although the two electric machines could also have different powers.

Particularly preferably, the first electric machine is arranged coaxially with the first drive input shaft and the rotor of the first electric machine is connected rotationally fixed to the first drive input shaft. In that way, during operation the first drive input shaft and the rotor of the first electric machine rotate at the same rotation speed. Alternatively, however, it is also possible for the rotor of the first electric machine and the first drive input shaft to be coupled by way of at least one gear ratio.

Alternatively preferred, but in addition thereto, in the drive unit according to the invention the second electric machine is in particular arranged coaxially with the second drive input shaft of the motor vehicle transmission, and the rotor of the second electric machine is connected rotationally fixed to the second drive input shaft. Correspondingly, during operation the rotor of the second electric machine and the second drive input shaft of the motor vehicle transmission rotate at the same rotation speed. Alternatively, however, the rotor of the second electric machine and the second drive input shaft could also be coupled by way of at least one intermediate gear ratio.

The drive unit according to the invention can in this case be operated in such manner that a change from a first gear acting between the two drive input shafts and the drive output shaft of the motor vehicle transmission and a second gear acting between the two drive input shafts and the drive output shaft can be carried out under load. For that purpose, at the beginning of the change the second coupling element of the second shifting device is first switched over from its second gear engagement position to its first gear engagement position and during the course of that switch-over a rotation speed synchronization in the second shifting device is carried out by the second electric machine and a traction force is supported by the first electric machine. Thereafter, in the first shifting device the first coupling element is moved from its actual gear engagement position, i.e., from the gear engagement position that corresponds to the gear engaged at the time, to its neutral position and for that, by interaction of the two electric machines a load-free condition of the first coupling element is produced. This is possible in the superimposition operating mode by virtue of the fact that the second coupling device is still, as before, in its first gear engagement position. After that, in the first shifting device the first coupling element is moved from the neutral position to the gear engagement position of the target gear, i.e., the gear engagement position that corresponds to the gear that is to be engaged, and for that purpose a rotation speed synchronization is carried out in the first shifting device by the first electric machine. Finally, in the second shifting device of the motor vehicle transmission the second coupling element is switched over from its first gear engagement position to its second gear engagement position, and during the course of that switch-over a rotation speed synchronization is carried out in the second shifting device by the second electric machine and a traction force is supported by the first electric machine. In that way gearshifts can be carried out between the first and second gears as power-shifts.

Alternatively, in the drive unit according to the invention a change from a first gear of the motor vehicle transmission acting between the two drive input shafts and the drive output shaft and a second gear of the motor vehicle transmission acting between the two drive input shafts and the drive output shaft can be carried out in that in the first shifting device the first coupling element is moved out of its current gear, i.e., the gear engagement position that corresponds to the gear engaged at the time, to its neutral position and for that purpose, by interaction of the two electric machines a load-free condition of the first coupling element is produced. After that, in the first shifting device the first coupling element is moved out of its neutral position to its target gear engagement position, i.e., to the gear engagement position that corresponds to the gear that is to be engaged, and for that purpose a rotation speed synchronization is carried out in the first shifting device by the two electric machines.

In addition, in a further development of one of the above two processes, as a function of the rotation speeds of the two electric machines, in the second gear acting between the two drive input shafts and the drive output shaft a shift to a third gear that can be reproduced by the motor vehicle transmission is carried out, in that in the second shifting device of the motor vehicle transmission, the second coupling element is first switched over from its second gear engagement position to its first gear engagement position, and during the course of that switch-over a rotation speed synchronization is carried out in the second shifting device by the second electric machine and a traction force is supported by the first electric machine. Thereafter, by interaction of the two electric machines a load-free condition of the first coupling element is produced and then, in the first shifting device the first coupling element is moved from its second gear engagement position to its neutral position. In that way the superimposition operating mode is obtained in the second planetary gearset and in this case the two electric machines can have rotation speeds that correspond with, or are at least similar to, one another.

In accordance with a possible design of a drive unit according to the invention, the first and/or the second planetary gearset of the motor vehicle transmission at least partially axially overlap with and is/are radially inside the rotor of the first electric machine. In that way a nested and hence also more compact structure of the drive unit can be produced. Preferably, both planetary gearsets overlap with and are radially inside the first electric machine.

Alternatively preferred, but in addition, the first shifting device and/or the second shifting device at least partially axially overlap with and is/are radially inside the rotor of the second electric machine. Advantageously, in that way an axial structural length of the drive unit can be reduced and thereby a more compact structure can be produced.

A drive unit corresponding to one or more of the above variants is in particular part of a motor vehicle drive axle which in this case is provided for an electric or hybrid vehicle. Preferably, the drive unit is arranged in a plane with drive output shafts each of which is associated with at least one drive wheel, and which are coupled to the drive output shaft of the motor vehicle transmission. Advantageously, in that way a more compact structure of a motor vehicle drive axle with the drive unit can be produced, wherein the drive output shaft of the motor vehicle transmission and the drive output shafts of the motor vehicle drive axle are in particular coupled by way of a differential gearset.

In the context of the invention, at least one motor vehicle drive axle of this type is provided in a hybrid or electric vehicle, which vehicle can be a passenger car or a utility vehicle. In this case a utility vehicle can be an at least partially electrically driven transporter or a lightweight to medium-weight bus or truck.

BRIEF DESCRIPTION OF THE DRAWINGS

Advantageous embodiments of the invention, which are explained below, are illustrated in the drawings which show:

FIG. 3: A tabular representation of various conditions of the drive units in FIGS. 1 and 2.

DETAILED DESCRIPTION

Figure 1:
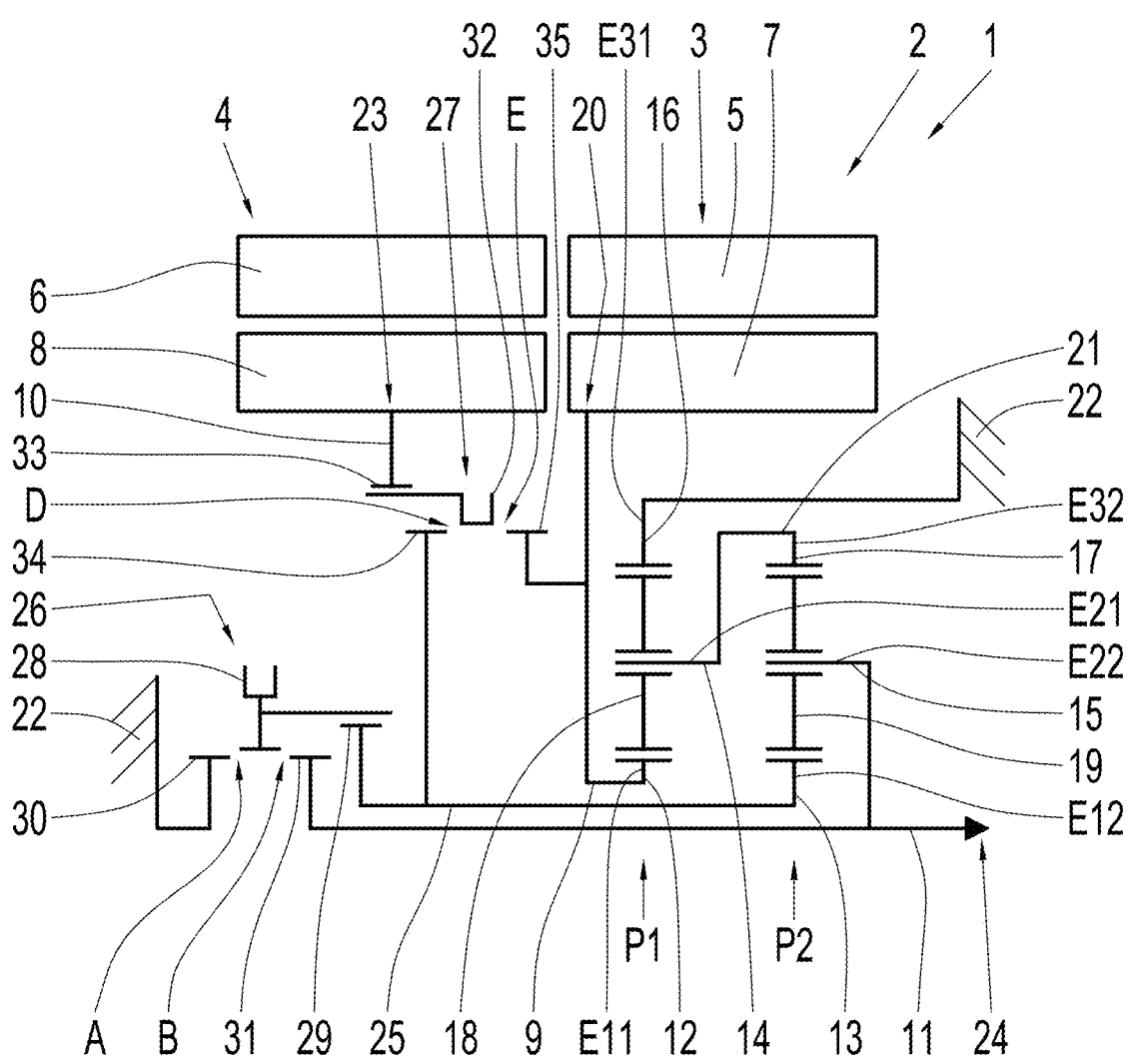
FIGS. 1 and 2: In each case a schematic view of a drive unit according to a respective embodiment of the invention.

FIG. 1 shows a schematic view of a drive unit 1 designed in accordance with an embodiment of the invention. This drive unit 1 consists of a motor vehicle transmission 2 and two electric machines 3 and 4, such that in this case the motor vehicle transmission 2 is designed in accordance with a first embodiment of the invention. In a principle familiar to those with a knowledge of the subject, the two electric machines 3 and 4 each comprise a stator 5 and 6 and a rotor 7 and 8 respectively, and the individual electric machines 3 and 4 can each be operated on the one hand as a generator and on the other hand as an electric motor.

The motor vehicle transmission 2 comprises a first drive input shaft 9, a second drive input shaft 10, a drive output shaft 11, and two planetary gearsets P1 and P2, each of these consisting of a first element E11 or E12 respectively, a second element E21 or E22 respectively and a third element E31 or E32 respectively. The first elements E11 and E12 of the respective planetary gearsets P1 and P2 are sun gears 12 and 13, whereas the second element E21 and E22 of the respective planetary gearsets P1 and P2 are planetary carriers 14 and 15. In addition, the respective third elements E31 and E32 of the planetary gearsets P1 and P2 are ring gears 16 and 17 of the planetary gearsets P1 and P2.

On each planetary carrier 14 or 15 of the planetary gearset P1 or P2 concerned, in each case at least one planetary gearwheel 18 or 19 is mounted to rotate, which meshes both with the respective sun gear 12 or 13 and with the respective ring gear 16 or 17 of the associated planetary gearset P1 or P2. Thus, the planetary gearsets P1 and P2 are minus planetary gearsets.

In the present case, the first element E11 of the first planetary gearset P1 is connected rotationally fixed to the first drive input shaft 9, which is also connected rotationally fixed at a connection point 20 to the rotor 7 of the electric machine 3. Thus, the first element E11 of the first planetary gearset P1 and the rotor 7 are connected rotationally fixed to one another by way of the first drive input shaft 9, so that the first element E11 and the rotor 7 always rotate at the same rotation speed. In the context of the invention, therefore, the first drive input shaft 9 can be made integrally with the first element E11 of the first planetary gearset P1 and/or with the rotor 7 of the electric machine 3.

The second element E21 of the first planetary gearset P1 and the third element E32 of the second planetary gearset P2 are permanently connected rotationally fixed to one another, this rotationally fixed connection being formed by way of a shaft 21, which can therefore if necessary be made integrally with the second element E21 of the first planetary gearset P1 and/or with the third element E32 of the second planetary gearset P2. The third element E31 of the first planetary gearset P1 is permanently connected rotationally fixed to a permanently immobilized structural element 22 which is a housing of the motor vehicle transmission 2, part of the housing or a component connected rotationally fixed thereto. In the transmission housing of the motor vehicle transmission 2, besides components of the motor vehicle transmission 2 itself the two electric machines 3 and 4 are preferably also accommodated. Owing to its permanently rotationally fixed connection to the rotationally fixed structural element 22, the third element E31 of the first planetary gearset P1 is permanently prevented from rotating.

As can be seen in FIG. 1, the second drive input shaft 10 is connected rotationally fixed to the rotor 8 of the electric machine 4, so that the second drive input shaft 10 and the rotor 8 always rotate at the same rotation speed. The rotationally fixed connection with the rotor 8 is in this case made at a connection point 23 of the second drive input shaft 10, so that the second drive input shaft 10 could also be made integrally with the rotor 8 of the electric machine 4. The drive output shaft 11 is connected rotationally fixed to the second element E22 of the second planetary gearset P2, and the drive output shaft 11 is further connected at a connection point 24 to a differential gearset—not shown here—of a differential gear system. Apart from that, the first element E12 of the second planetary gearset P2 is connected rotationally fixed to a shaft 25, so that the shaft 25 and the first element E12 of the second planetary gearset P2 could again be made integrally.

The motor vehicle transmission 2 also comprises two shifting devices 26 and 27, by means of which the function of four shifting elements A, B, D, and E can be reproduced. The shifting device 26 comprises a coupling element 28 in the form of a shifting sleeve, which can be positioned in a first gear engagement position and in a second gear engagement position, and also in a neutral position between the two. This positioning is done by an actuator—not shown here. The coupling element 28 of the shifting device 26 is guided rotationally fixed but axially displaceably on a tooth array 29, which is connected rotationally fixed to the shaft 25 and hence also to the first element E12 of the second planetary gearset P2.

From its neutral position shown in FIG. 1, the coupling element 28 can on the one hand be moved to the first gear engagement position, in which while still engaged with the tooth array 29 the coupling element 28 also engages with a tooth array 30 which is attached rotationally fixed to the permanently immobilized structural element 22 and is therefore permanently immobilized. This accordingly results in an immobilization of the shaft 25 and hence also of the first element E12 of the second planetary gearset P2. In the first gear engagement position of the coupling element 28 the actuated state of the shifting element A is reproduced.

On the other hand, the coupling element 28 can be moved from its neutral position to its second gear engagement position, in which the coupling element 28, while still engaged with the teeth 29, additionally engages with a tooth array 31 which is attached rotationally fixed to the drive output shaft 11 and is therefore also connected to the second element E22 of the second planetary gearset P2. Accordingly, in the second gear engagement position of the coupling element 28 there is a rotationally fixed connection between the first element E12 of the second planetary gearset P2 and the second element E22 of the second planetary gearset P2, which results in blocking of the second planetary gearset P2. In the second gear engagement position of the coupling element 28 the actuated state of the shifting element B is reproduced.

In the shifting device 27, a coupling element 32 in the form of a shifting sleeve is also provided, which can be moved by an actuator—not shown here—from a neutral position shown in FIG. 1, on the one hand to a first gear engagement position, and on the other hand to a second gear engagement position. The coupling element 32 is permanently guided in a rotationally fixed but axially displaceable manner on a tooth array 33 which is attached rotationally fixed to the second drive input shaft. When the coupling element 32 is positioned in its first gear engagement position an actuated state of the shifting element D is reproduced, wherein while still engaged with the tooth array 33 the coupling element 32 also engages in a tooth array 34 which is connected rotationally fixed to the shaft 25 and therefore also to the first element E12 of the second planetary gearset P2.

On the other hand, when the coupling element 32 is changed to its second gear engagement position, then the shifting device 27 reproduces an actuated state of the shifting element E. In this second gear engagement position, while still engaged with the tooth array 33 the coupling element 32 also engages with a tooth array 35 which is connected rotationally fixed to the first drive input shaft 9. Thus, in the second gear engagement position of the coupling element 32 the second drive input shaft 10 is connected rotationally fixed to the first drive input shaft 9.

As can be seen in FIG. 1, the first drive input shaft 9, the second drive input shaft 10, the drive output shaft 11 and also the planetary gearsets P1 and P2 are arranged coaxially with one another, and in addition, besides the shafts 21 and 25 the two electric machines 3 and 4 are also positioned coaxially thereto. Of the planetary gearsets P1 and P2, the second planetary gearset P2 is arranged axially adjacent to the connection point 24 of the drive output shaft 11.

In the present case the two planetary gearsets P1 and P2 are arranged axially overlapping with the first electric machine 3 in such manner that the planetary gearsets P1 and P2 are positioned inside the first electric machine 3. Furthermore, the two shifting devices 26 and 27 are arranged axially overlapping with and radially inside the second electric machine 4, with the shifting device 27 positioned axially adjacent to the first planetary gearset P1 and axially overlapping with the shifting device 26, for which purpose the shifting device 27 is located radially between the shifting device 26 and the electric machine 4.

Whereas the drive output shaft 11 is essentially made as a solid shaft and, starting from the connection point 24, extends over the whole axial length of the motor vehicle transmission 2, the first drive input shaft 9, the second drive input shaft 10, and the shafts 21 and 25 are hollow shafts. The first drive input shaft 9 extends axially adjacent to the first planetary gearset P1 and, starting from the first element E11 of the first planetary gearset P1, it extends radially outward to the electric machine 3, while the second drive input shaft 10 is in the form of a short connection piece and in this case extends radially between the shifting device 27 and the rotor 8 of the electric machine 4. The shaft 21 extends axially between the two planetary gearsets P1 and P2 and, starting from the second element E21 of the first planetary gearset P1, it extends radially outward for connection to the third element E32 of the second planetary gearset P2. Moreover, starting from the second planetary gearset P2 the shaft 26 extends axially to the shifting device 26, for which purpose the shaft 25 passes radially between the first planetary gearset P1 and the drive output shaft 11.

Figure 2:
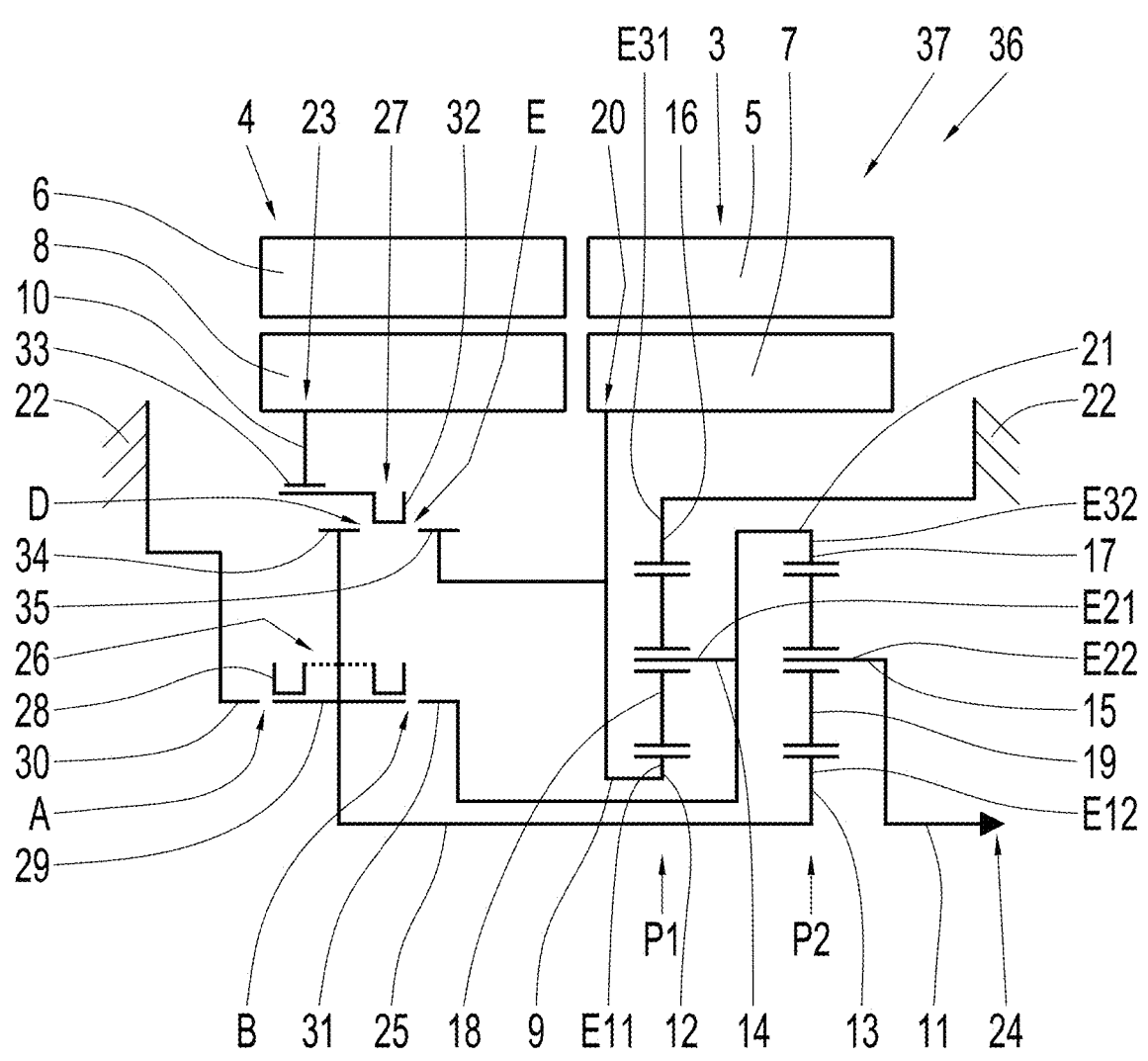

FIG. 2 shows a schematic representation of a drive unit 36 that corresponds to a further possible design according to the invention. This possible design corresponds very largely to the previous variant according to FIG. 1, with the difference that in a motor vehicle transmission 37 of the drive unit 36 on the one hand the shifting device 26 is designed differently. Thus, in its second gear engagement position, the coupling element 28 of the shifting device 26 now engages with a tooth array 31 which is connected rotationally fixed to the shaft 21. In that way, in its second gear engagement position the coupling element 28 connects the shaft 25 rotationally fixed to the shaft 21, with the result that there is also a rotationally fixed connection between the first element E12 of the second planetary gearset P2 and the third element E32 of the second planetary gearset P2. Consequently, the second planetary gearset P2 is blocked.

On the other hand, the two shifting devices 26 and 27 are now arranged at least essentially axially overlapping, with the shifting devices 26 and 27 as before axially overlapping with and radially inside the electric machine 4. The shifting device 27 is positioned radially between the shifting device 26 and the electric machine 4. Finally, the shaft 25 is again in the form of a solid shaft and the drive output shaft, again made as a solid shaft, extends only axially between the connection point 24 and the second planetary gearset P2. In this case, for connection to the shifting device 26, the shaft 21 is prolonged starting from the connection to the second element E21 of the first planetary gearset P1 axially into the area of the shifting device 26 and for that purpose it extends radially between the shaft 25 and the first planetary gearset P1. In other respects, the design option according to FIG. 2 corresponds to the variant according to FIG. 1, so that reference can be made to the description of the latter.

FIG. 3 shows a tabular summary of various conditions I to VIII which can each be produced by the drive units 1 and 36 shown in FIGS. 1 and 2 respectively. In this case, in conditions I, II and VI a first gear G1 is engaged in the respective motor vehicle transmission 2 or 37 of the drive unit 1 or 36 concerned, for which purpose in the shifting device 26 the coupling element 28 is moved to its first gear engagement position (actuated state of A). In that way the shaft 25 and hence the first element E12 of the second planetary gearset P2 is immobilized, so that the first drive input shaft 9 is coupled to the drive output shaft 11 via both planetary gearsets P1 and P2.

In condition I, in addition the coupling element 32 of the shifting element 27 is also in its second gear engagement position (actuated state of E), so that the second drive input shaft 10 is also connected rotationally fixed to the first drive input shaft 9. Consequently, in condition I both electric machines 3 and 4 participate in the first gear G1 whereby a conjoint drive by the electric machines 3 and 4 can take place.

In contrast, in condition II, besides the positioning of the coupling element 28 of the shifting device 26 in its first gear engagement position, the coupling element 32 of the shifting device 27 is placed in its first gear engagement position (actuated condition of D), whereby the second drive input shaft 10 is connected rotationally fixed to the shaft 25 and is therefore immobilized together with the latter. Thus, the electric machine 4, whose rotor 8 is also immobilized in condition II, can also be used for supporting a traction force during a shift in the shifting device 26 as well as for synchronizing the shifting device 26.

In condition VI, on the other hand, only the first drive input shaft 9 is coupled to the drive output shaft 11 and therefore only the electric machine 3 is connected, whereas the electric machine 4 is decoupled. For that purpose, the neutral position of the coupling element 32 in the shifting device 27 has to be adopted, while the coupling element 28 of the shifting device 26 is positioned in its first gear engagement position. In that way drag losses in the electric machine 4 can be avoided.

In the motor vehicle transmissions 2 and 37 of the drive units 1 and 36, a second gear G2 can be engaged by moving the coupling element 28 of the shifting device 26 to its second gear engagement position (actuated state of B). This is done in each of the conditions III, IV, and VII. In the second gear engagement position of the coupling element 28 the shaft 25 is connected rotationally fixed to the drive output shaft 11, which results in blocking of the second planetary gearset P2. In that way the first drive input shaft 9 is then coupled to the drive output shaft 11 by way of the first planetary gearset P1.

In condition III, in addition the coupling element 32 of the shifting element 27 is moved to its first gear engagement position (actuated state of D), whereby the second drive input shaft 10 is connected rotationally fixed to the drive output shaft 11. In that case, in condition III, by way of the electric machine 4 thereby also connected rotationally fixed to the drive output shaft 11, a traction force can be supported during the shifting in the shifting device 26, the shifting device 26 can be synchronized, and if necessary, the drive output shaft 11 can also be driven.

In contrast, in condition IV the coupling element 32 of the shifting device 27 is in addition moved to its second gear engagement position (actuated state of E), so that the two drive input shafts 9 and 10 are again connected rotationally fixed to one another. Accordingly, both of the drive input shafts 9 and 10 are coupled with the drive output shaft 11 in the second gear G2, whereby both electric machines 3 and 4 are connected in the second gear G2.

Furthermore, it is possible for only the first drive input shaft 9 and therefore the electric machine 3 alone to be connected in the second gear G2 (condition VII), for which purpose, when the coupling element 28 of the shifting device 26 is in its second gear engagement position, the coupling element 32 of the shifting device 27 must again be moved to its neutral position. As a result, the electric machine 4 is decoupled, so that drag losses can be reduced.

In condition V drive movements of the electric machines 3 and 4 can be superimposed in a superimposition operating mode, for which purpose in the shifting device 27 the coupling element 32 must be placed in its first gear engagement position (actuated state of D), while the coupling element 28 of the shifting device 26 is in its neutral position. In that way the second drive input shaft 10 is connected rotationally fixed to the shaft 25 and hence also to the first element E12 of the second planetary gearset P2, whereas the first drive input shaft 9 is coupled by way of the first planetary gearset P1 to the third element E32 of the second planetary gearset P2. In this condition V the electric machines 3 and 4 can support the torques of each other with a fixed torque ratio and variable rotation speed. If a stationary gear ratio of the second planetary gearset P2 is chosen numerically higher by one than the numerical stationary gear ratio of the first planetary gearset P1, then the two electric machines 3 and 4 are connected with the same torque ratio to the drive output shaft 11 and mutually support one another with a torque of equal value. In that way the two electric machines 3 and 4 can advantageously be constructed identically.

Furthermore, in condition V, during a superimposed operating mode a third gear G3 of the motor vehicle transmission 2 or 37 can be obtained. For that purpose, the two electric machines 3 and 4 must be matched to one another in their operation, whereby due to the superimposition at the second planetary gearset P2, compared with the second gear G2 higher rotation speeds of the drive output shaft 11 and hence also higher driving speeds are reached. In this case the two electric machines 3 and 4 can have the same rotation speed or at least similar rotation speeds.

On the other hand, in condition VIII both of the drive input shafts 9 and 10 are decoupled from the drive output shaft, since in the shifting device 26 the coupling element 28 is in its neutral position and in the shifting device 27 the coupling element 32 is in its second gear engagement position (actuated state of E). In that way, although the two drive input shafts 9 and 10 are connected rotationally fixed to one another, owing to the free rotation of the shaft 25 there is no coupling to the drive output shaft 11.

By virtue of an appropriate concatenation of the conditions I to V, in the drive units 1 and 36 powershifts can be carried out in the motor vehicle transmissions 2 and 37 from the first gear G1 to the second gear G2: at the beginning, in condition I the two electric machines 3 and 4 are connected in the first gear G1. After that, in the shifting device 27 the coupling element 32 is then moved from its second gear engagement position to its first gear engagement position, whereby during the switch-over a synchronization is carried out in the second shifting device 27 by braking by means of the second electric machine 4 and a traction force is supported by the electric machine 3 in the first gear G1. When the switch-over has been completed, the second drive input shaft 10 and hence also the electric machine 4 is braked and the condition II is produced.

Next, a load-free condition of the coupling element 28 in the shifting device 26 is produced by adjusting a suitable torque ratio between the electric machines 3 and 4, and the coupling element 28 is then moved to its neutral position, whereby the condition V is produced. In this condition V, the traction force is also supported in the superimposition operating mode. Thereafter the coupling element 28 is moved to its second gear engagement position and to do that a rotation speed synchronization is carried out in the shifting device 26 by appropriately adjusting a rotation speed of the electric machine 3.

When the second gear engagement position of the coupling element 28 has been reached, the second gear G2 between the first drive input shaft 9 and the drive output shaft 11 is then engaged and the condition III is realized. For the ultimate engagement of the second gear G2 between the two drive input shafts 9 and 10 and the drive output shaft 11, a switch-over is again carried out in the shifting device 27 and the electric machine 3 again supports the traction force. For the switch-over, the electric machine 4 carries out a rotation speed synchronization in the shifting device 27 and when that switch-over has been completed the condition IV has been reached so that both electric machines 3 and 4 are connected in the second gear G2.

A downshift under load from the second gear G2 to the first gear G1 can then take place by the reverse of the method described above. Furthermore, if higher driving speeds are required than are permissible in the second gear G2, then after the condition IV has been established a switch-over in the shifting device 27 is again carried out and the condition V is produced thereby, in order to obtain the third gear G3.

However, apart from a powershift between the gears G1 and G2 shifts can also be carried out with traction force interruption. For that purpose, starting from condition I a reduction of the torques of the electric machines 3 and 4 is carried out with the result that the coupling element 28 of the shifting device 26 in its first gear engagement position becomes free from load, whereupon the coupling element 28 is moved to its neutral position. This corresponds to the condition VIII, in which no gear is engaged. Thereafter, the rotation speeds of the electric machines 3 and 4 are adjusted in such manner that the rotation speeds in the shifting device 26 are synchronized for moving the coupling element 28 to its second gear engagement position. The coupling element 28 is then changed to its second gear engagement position and thereby the condition IV is reached. After that a switch can be carried out to the condition V analogously to the manner described earlier, in order to engage the third gear G3.

Figure 4:
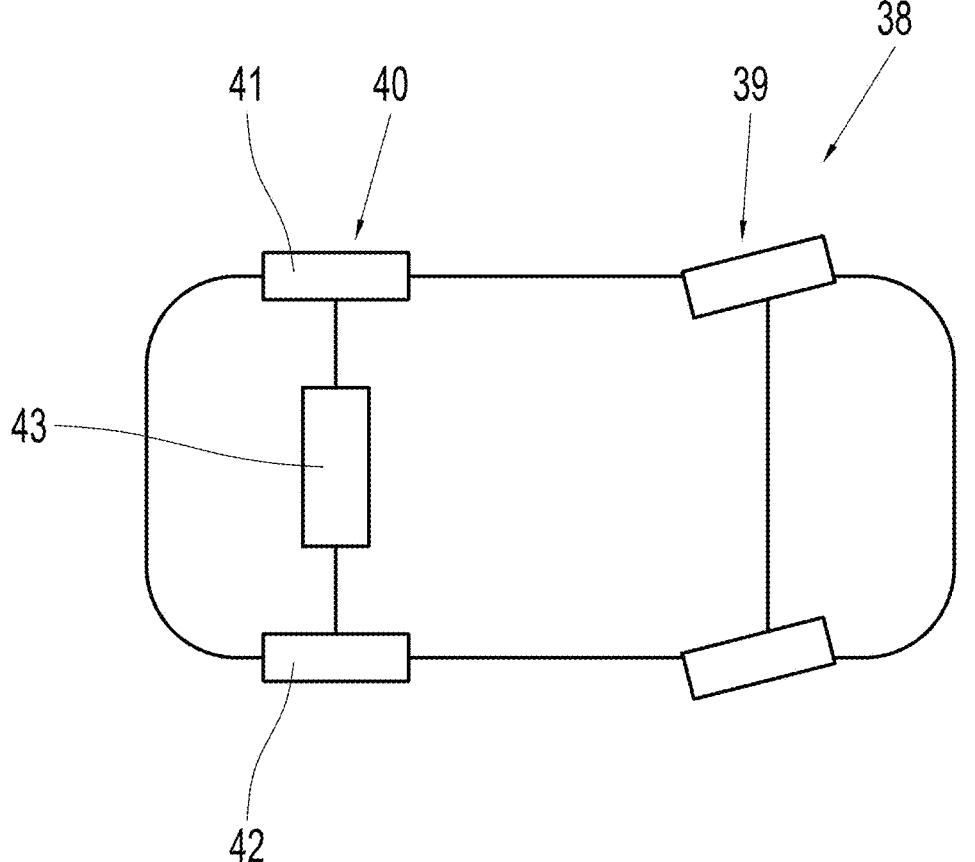
FIG. 4: A schematic view of an electric vehicle that corresponds to a preferred embodiment of the invention.

Finally, FIG. 4 shows a schematic view of an electric vehicle 38. Besides a steerable, non-driven vehicle axle 39 the electric vehicle 38 also comprises a motor vehicle drive axle 40 with drive wheels 41 and 42. Part of the motor vehicle drive axle 40 is also the drive unit 43, which corresponds to one of the drive units 1 or 36. The drive wheels 41 and 42 are coupled to the drive output shaft of the drive unit 43 by way of an interposed differential gearset—not shown here.

Whereas the vehicle axle 39 is a front axle of the electric vehicle 38, the motor vehicle drive axle 40 is a rear axle of the electric vehicle 38. However, alternatively or in addition to the motor vehicle drive axle 40 the vehicle axle 39 too could be designed as a driven axle, if necessary, with a drive unit of analogous structure.

By virtue of the designs according to the invention a compactly built motor vehicle transmission can be provided, with which a suitable connection of two drive machines is possible.

INDEXES

1 Drive unit
2 Motor vehicle transmission
3 Electric machine
4 Electric machine
5 Stator
6 Stator
7 Rotor
8 Rotor
9 Drive input shaft
10 Drive input shaft
11 Drive output shaft
12 Sun gear
13 Sun gear
14 Planetary carrier
15 Planetary carrier
16 Ring gear
17 Ring gear
18 Planetary gearwheel
19 Planetary gearwheel
20 Connection point
21 Shaft
22 Permanently immobilized structural element 23 Connection point
24 Connection point
25 Shaft
26 Shifting device
27 Shifting device
28 Coupling element
29 Tooth array
30 Tooth array
31 Tooth array
32 Coupling element
33 Tooth array
34 Tooth array
35 Tooth array
36 Drive unit
37 Motor vehicle transmission
38 Electric vehicle
39 Vehicle axle
40 Vehicle drive axle
41 Drive wheel
42 Drive wheel
43 Drive unit
P1 First planetary gearset
P2 Second planetary gearset
E11 First element of the first planetary gearset
E21 Second element of the first planetary gearset
E31 Third element of the first planetary gearset
E12 First element of the second planetary gearset
E22 Second element of the second planetary gearset
E32 Third element of the second planetary gearset
A Shifting element
B Shifting element
D Shifting element
E Shifting element
G1 First gear
G2 Second gear
G3 Third gear
I to VIII Conditions

The invention claimed is:

1. A method for operating a motor vehicle, comprising:
providing a drive unit comprising:
a first electric machine having a rotor;
a second electric machine having a rotor;
a first drive input shaft coupled to the rotor of the first electric machine;
a second drive input shaft coupled to the rotor of the second electric machine;
a drive output shaft; and
a first planetary gearset and a second planetary gearset each having, respectively, a first element, a second element, and a third element in the form, respectively, of a sun gear, a planetary carrier, and a ring gear;
a first shifting device and a second shifting device each configured to engage various gears;
wherein the first shifting device comprises a first coupling element which can be positioned in precisely two gear engagement positions and in a first gear engagement position the first coupling element immobilizes the first element of the second planetary gearset;
wherein the first element of the first planetary gearset is connected rotationally fixed to the first drive input shaft and the third element of the first planetary gearset is immobilized;
wherein the second element of the second planetary gearset is connected rotationally fixed to the drive output shaft;

wherein the second element of the first planetary gear-set is connected rotationally fixed to the third element of the second planetary gearset;

and wherein the second shifting device comprises a second coupling element which can be positioned in precisely two gear engagement positions, such that in a first gear engagement position, the second coupling element connects the first element of the second planetary gearset in a rotationally fixed manner to the second drive input shaft, and in a second gear engagement position brings the first drive input shaft into a rotationally fixed connection with the second drive input shaft; and wherein the first coupling element in the second gear engagement position connects the first element of the second planetary gearset in a rotationally fixed manner to the second element of the second planetary gearset;

engaging a first gear between the first drive input shaft and the drive output shaft by moving the first coupling element to its first gear engagement position, wherein engaging the first gear includes moving the first coupling element to the first gear engagement position and moving the second coupling element to the second gear engagement position;

engaging a second gear between the first drive input shaft and the drive output shaft by moving the first coupling element to the second gear engagement position, wherein engaging the second gear includes moving the first coupling element to the second gear engagement position and moving the second coupling element to the second gear engagement position;

making a change under load between a first gear acting between the first and second drive input shafts and the drive output shaft of the motor vehicle transmission, and a second gear acting between the first and second drive input shafts and the drive output shaft of the motor vehicle transmission, wherein making the change includes carrying out a switch-over in the second shifting device of the motor vehicle transmission by moving the second coupling element from the second gear engagement position to the first gear engagement position of the second coupling element;

carrying out, during the switch-over in the second shifting device, a rotation speed synchronization in the second shifting device by the second electric machine while a traction force is supported by the first electric machine;

moving the first shifting device of the first coupling element out of its current gear engagement position to its neutral position, thereby producing, by interaction of the two electric machines, a load-free condition of the first coupling element;

after that, in the first shifting device, moving the first coupling element of the first shifting device out of its neutral position to its target gear engagement position, and thereby carrying out a rotation speed synchronization in the first shifting device by the first electric machine; and carrying out a switch-over of the second coupling element in the second shifting device from the first gear engagement position to the second gear engagement position of the second coupling element and during the course of the switch-over, a rotation speed synchronization is carried out in the second shifting device by the second electric machine and a traction force is supported by the first electric machine.

2. The method according to claim 1, comprising:

obtaining a superimposition operating mode of the drive input shafts by moving only the second coupling element to the first gear engagement position; and/or engaging a third gear between the two drive input shafts and the drive output shaft.

3. The method according to claim 1, comprising:

engaging a third gear, as a function of rotation speeds of the first and second electric machines, in the second gear acting between the first and second drive input shafts and the drive output shaft;

switching, in the second shifting device of the motor vehicle transmission, the second coupling element from its second gear engagement position to its first gear engagement position, including carrying out a rotation speed synchronization in the second shifting device by the second electric machine and a traction force is supported by the first electric machine;

producing a load-free condition of the first coupling element, by interaction between the first and second electric machines; and moving the first coupling element of the first shifting device from its second gear engagement position to its neutral position.

* * * * *